United States Patent [19]
King

[11] Patent Number: 5,325,938
[45] Date of Patent: Jul. 5, 1994

[54] AUTOMATIC SHOPPING CART BRAKE ENGAGED BY NESTING OF CARTS

[76] Inventor: Clyde V. King, 4501 Husband Rd., Paducah, Ky. 42003

[21] Appl. No.: 136,396

[22] Filed: Oct. 13, 1993

Related U.S. Application Data

[63] Continuation of Ser. No. 866,792, Apr. 8, 1992, abandoned.

[51] Int. Cl.5 ............................................. B62B 5/04
[52] U.S. Cl. .................................... 188/19; 188/2 D; 188/29; 280/33.994
[58] Field of Search ............... 188/2 D, 2 F, 19, 20, 188/29, 74, 166, 167; 280/DIG. 4, 33.994

[56] References Cited

U.S. PATENT DOCUMENTS

| | | | |
|---|---|---|---|
| 3,095,211 | 6/1963 | Altherr | 188/250 G X |
| 3,112,121 | 11/1963 | Hummer | 188/250 G X |
| 3,458,015 | 7/1969 | Collins et al. | 188/250 G X |
| 3,501,164 | 3/1970 | Peterson | 188/250 G X |
| 4,018,449 | 4/1977 | Anderson | 188/250 G X |
| 4,084,663 | 4/1978 | Haley | 188/250 G X |
| 4,840,388 | 6/1989 | Doughty | 188/250 G X |
| 4,976,447 | 12/1990 | Batson | 188/250 G X |
| 5,090,517 | 2/1992 | Doughty | 188/250 G X |

FOREIGN PATENT DOCUMENTS 2242877 3/1924 Fed. Rep. of Germany ... 188/250 G

Primary Examiner—Robert J. Oberleitner
Assistant Examiner—Josie A. Ballato
Attorney, Agent, or Firm—Middleton & Reutlinger

[57] ABSTRACT

A shopping cart brake adapted for use on commercially available carts designed to provide an automatic brake which remains engaged to hold the cart in a stationary position, unless the user manually disengages the brake of the cart for moving the cart. Upon parking the shopping cart, the interaction of the forward basket portion of the last cart in the stack contacting the back panel of the preceding cart automatically disengages the brakes of the preceding cart so that the brakes of the last cart in the stack of carts will be automatically engaged upon parking the cart and a user must manually disengage the brake of the last cart in order to move the stack of carts.

15 Claims, 5 Drawing Sheets

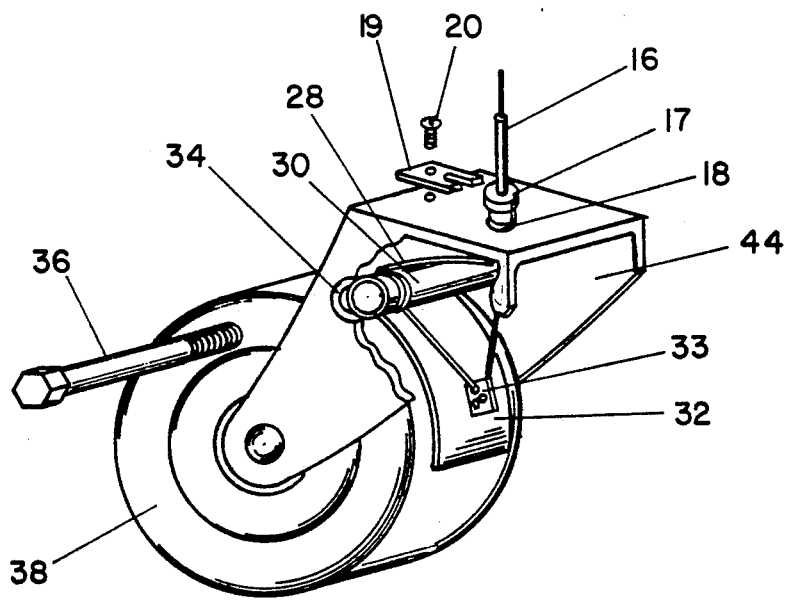
FIG. 4
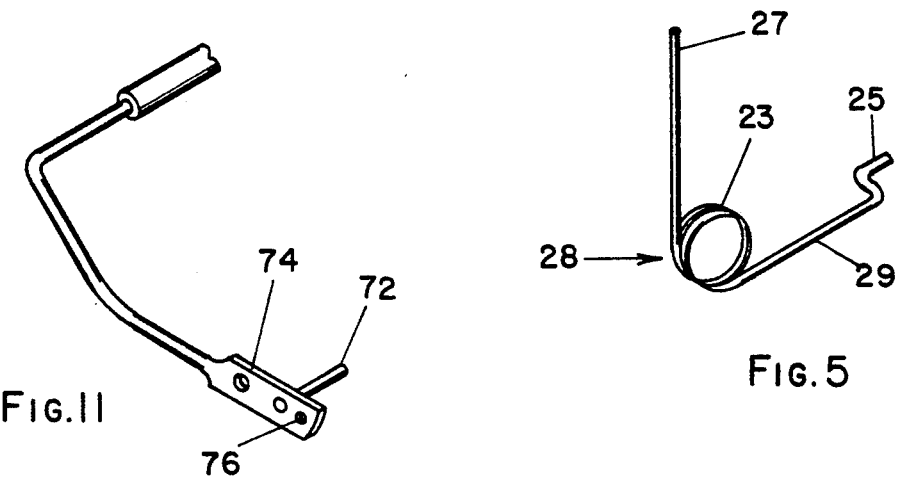
FIG. 11
FIG. 5
FIG. 12
FIG. 13

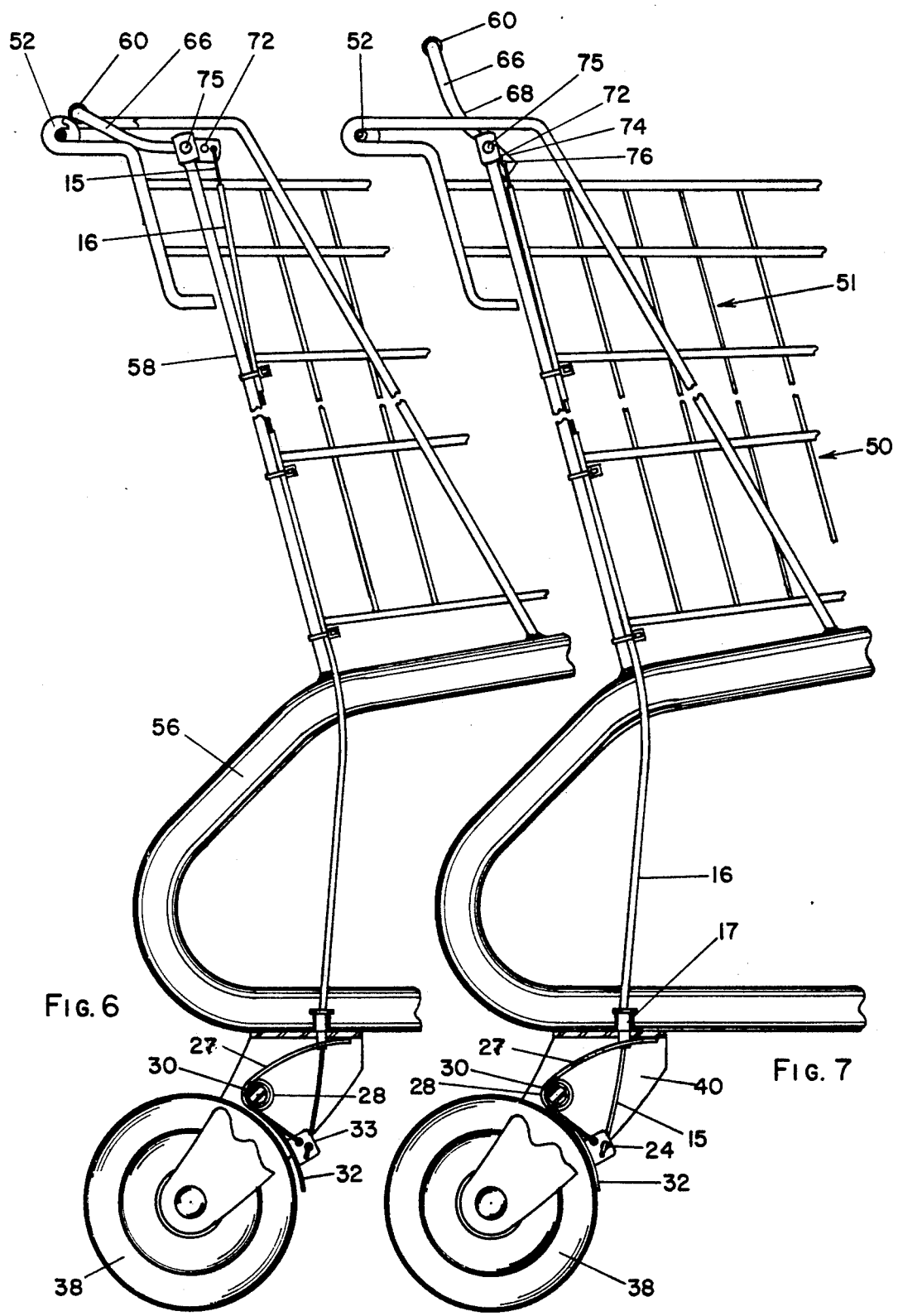

AUTOMATIC SHOPPING CART BRAKE ENGAGED BY NESTING OF CARTS

This application is a continuation of U.S. patent application Ser. No. 07/866,792 filed on Apr. 8, 1992, now abandoned.

BACKGROUND OF THE INVENTION

The present invention relates to a shopping cart brake is automatically engaged in a stand-alone position and which must be manually disengaged by the user before moving the cart.

Typical shopping carts which are commercially available are manufactured to be free-wheeling and employ no brake system. These unrestrained free-wheeling shopping carts rolling freely around a parking lot causes damage from running into vehicles and shoppers, as well as causing accidents when the carts roll in front of moving vehicles. The present invention addresses the problem by means of a shopping cart brake. The shopping cart brake of the present invention is designed so that when the cart is left unattended the rear wheel or wheels will lock. If the carts are being stacked (put together) to be moved, the cart in back will automatically release the brake of the cart in front of it. Only the last cart's brake remains active. The brake of the last cart will stay activated until another cart is pushed into it and becomes the last cart in line, or until someone takes hold of the handle of the last cart, wherein the brakes of the last cart and all of the proceeding carts will be released so the "cart train" can be moved to the desired location.

Application of the shopping cart brakes of the present invention on existing free-wheeling carts will eliminate or at least cut down on the damage caused by parking lot attendants slamming the carts into one another, for the brake of the instant invention will require that the handle be depressed in order for user to move the carts.

There are other shopping cart brake devices known in the art; however, none of these devices have achieved commercial success due to the complexity of the devices, the cost, or because of the unadaptability of the brakes for a variety of difference style carts.

For instance, U.S. Pat. No. 3,501,164 shows a shopping cart in which brake shoe is connected to brake rod which is actuated by the pivoting of a cross member to actuate a rod through a pivot plate. When two carts are telescoped during nesting, the cross rod is contacted by vertical members of the upwardly pivoting gate pivoting plate to release the brake.

U.S. Pat. No. 3,095,211 shows a shopping cart having a brake plate with a brake cup for engaging the cart wheel and being actuated by arms through brake lever. During telescoping of the carts, the basket of one cart engages the rear wall of a second cart and raises the wall. This causes the wall to contact the arms of the brake lever, thus releasing the brake cup from engagement with the wheel.

A brake system for a shopping cart having a brake arm and a brake element which engages a wheel is disclosed in U.S. Pat. No. 2,958,537. During telescoping of two carts, an inclined rim of one cart engages the brake arm of an associated cart to thereby lift a link to release the brake. The control bar rides over a cam which is fixed to the side wall of the cart basket and releases the brake mechanism during telescoping of the carts.

Another shopping cart having a braking body for the wheel is shown in U.S. Pat. No. 4,840,388. The brake is actuated by an operating member through connecting straps. During nesting, the rear panel is pushed upwardly by the next cart, thereby raising the arm upwardly and releasing the brake mechanism.

In U.S. Pat. No. 4,018,449, a brake mechanism for a shopping cart wheel utilizes a wheel lock having walls with edges for engaging the wheel. A second cart engages the frame member of the rear gate during nesting and pivots it upwardly, thereby actuating the cable to release the wheel lock.

Five U.S. Pat. Nos. 3,061,049, 3,458,015, 3,500,965, 4,976,447 and 5,046,748 show various brake mechanisms for cart structures. In U.S. Pat. No. 3,061,049, a brake shoe engages a caster wheel of a dump cart. U.S. Pat. No. 3,458,015 shows a shopping cart with a brake shoe for a wheel. The device disclosed in U.S. Pat. No. 3,500,965 shows a friction means for the wheel of a shopping cart. U.S. Pat. No. 4,976,447 shows a shopping cart having a concentric brake shoe for a wheel. In addition, U.S. Pat. No. 5,046,748 shows a walker having a brake shoe for a wheel, which brake shoe is actuated by a cable and handle. Three other references, U.S. Pat. Nos. 2,785,906, 3,112,121 and 4,084,663 show other cart structures having brake mechanisms which release during nesting.

It is an object of the present invention to provide a shopping cart brake which is automatically engaged in the stand-alone position locking the wheels of the cart, whereby the user must manually disengage the brakes to move the cart.

It is another object of the present invention to provide a brake assembly whereby upon stacking of the carts, one behind the other, the cart in the rear of the stack will automatically release the brake of the preceding cart in the stack. Only the brakes of the rear cart in the stack will remain activated, until another cart is pushed into it and becomes the rear cart in the stack, or until a user takes hold of the handle disengaged the brakes of the rear cart allowing movement of the stack.

It is yet another object of the present invention for the shopping cart brake of the present invention to be adaptable to work on any size of shopping cart and any design.

SUMMARY OF THE INVENTION

The present invention relates to a shopping cart brake assembly for use on commercially available shopping carts. The typical shopping cart includes a frame having wheels, a generally rectangularly shaped wire basket having a pair of opposing side panels connected to a front end panel, a floor panel, and a hinged rear panel which is pivotally connected to the rear corners of the side panels. The wire basket usually has at least one pair of vertical and diagonal reinforcement rods for providing additional structural strength and-support.

The shopping cart brake system includes a wheel brake assembly having a wheel housing mounted to the frame of the shopping cart, and a wheel rotatably mounted onto an axle within the wheel housing. The brake assembly includes a brake shoe having a mandrel attached at one end of its outer exterior surface, and a generally centrally located tab extending from the exterior brake shoe surface which has at least one hole. A means for pivotally attaching the brake mandrel within the wheel housing such as a bolt provides for engagement of the interior contact surface of the brake shoe with the wheel. The brake assembly also utilizes a spring within the housing for biasing the brake shoe against the wheel when the cart is parked, and a means such as a cable for retracting the brake shoe to permit rotation of the wheel.

The shopping cart braking systems includes a handle assembly which includes a handle having a central member with a pair of lateral arms having flattened distal ends. The lateral arms are pivotally attached to the lateral arms to the frame of the shopping cart so that the flattened distal end of the lateral arms extend pass the pivot point. A stop means such as a stud attached to the lateral arms limits the pivotal movement of the handle. A means such as a cable connects the handle with the brake assembly so that a user can manually pivot the handle to disengage the brake shoe from against the shopping cart wheel.

The shopping cart brake system of the present invention also provides for stopping control of individual parked or unattended carts as well as a controlled method of stacking a plurality of carts one behind another. When the front end panel of a cart being stacked is inserted within a parked cart, the hinged rear panel of the parked cart is pivoted upward. The vertical reinforcement rod of the hinged rear panel of the parked cart slidably engages the stud extending from one or both of the lateral arms of the parked cart to pivot the handle and disengage the brake of the front cart. This allows several carts to be stacked together and controlled with the engaged brakes of the last cart in the stack.

BRIEF DESCRIPTION OF THE DRAWINGS

A better understanding of the present invention will be had upon reference to the following description in conjunction with the accompanying drawings in which like numerals refer to like parts throughout the several views and wherein:

FIG. 4 is a perspective cut-away side view showing the shopping cart housing, wheel, and brake assembly of the present invention.

FIG. 5 is a plane side view showing the torsion spring of the brake assembly.

FIG. 6 is a plane side view showing the handle and brake assembly of the shopping cart in the disengaged in-use position.

FIG. 7 is a plane side view of the present invention showing the handle and brake assembly of the shopping cart in the engaged parked position.

FIG. 11 is a perspective view showing the lateral arm of the handle rod of the present invention.

FIG. 12 is a top view of the handle rod of the present invention.

FIG. 13 is a perspective view of the flattened end portion of the handle rod of the present invention.

Figure 1:
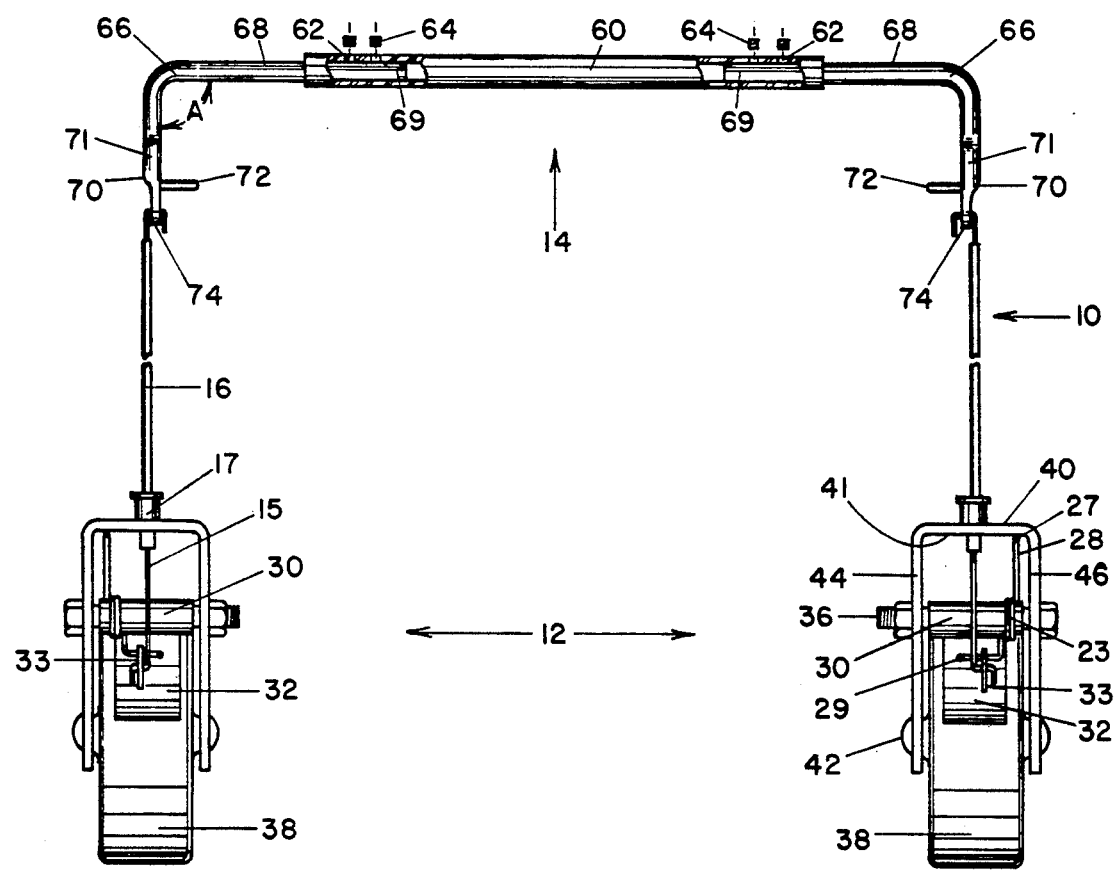
FIG. 1 is a rear perspective view of the present invention showing a cut-away view of the handle assembly and brake assembly.
Figure 2:
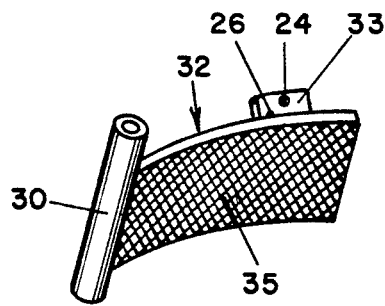
FIG. 2 is a perspective bottom view showing the brake shoe of the present invention as shown in FIG. 1.
Figure 3:
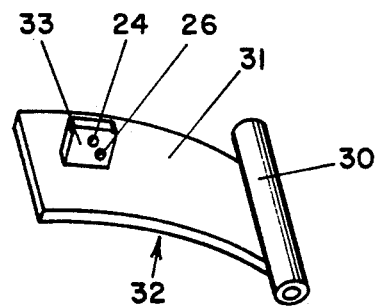
FIG. 3 is a perspective top view showing the brake shoe of the present invention.

The shopping cart brake system 10 is comprised of a wheel brake assembly 12 and handle assembly 14 as shown in FIG. 1.

The preferred embodiment of the present invention utilizes a wheel brake assembly having a brake shoe 32 comprised of metal or hard plastic as shown in FIGS. 1-4, and 6-7, including a mandrel 30 attached at one end of the outer exterior surface 31 of the brake shoe 32. A centrally located tab 33 having at least one cable tab eyelet 24 extending perpendicular to and upward from the outer exterior surface 31 of the brake shoe 32. As shown best in FIG. 2, the interior contact brake shoe surface 35 may be gnarled of formed having irregularities, or with some type of frictional tape or coating to provide additional friction upon activation of the brake resulting in engagement between the interior contact surface 35 of the brake shoe 32 and a cart wheel 38.

The preferred embodiment of the brake shoe assembly may be enclosed within various shaped wheel housings as shown in FIGS. 1 and 4. A plane side view in FIG. 4, shows a trapezoidal shaped housing 40 including a wheel 38 and axle 42 assembly at the bottom of the housing 40. The mandrel 30 is sized to fit between the inner wall 44 and outer wall 46 of the housing 40. A shoulder bolt 36 extends between holes 34 which have been aligned and drilled through the inner wall 44 and outer wall 46 of the housing 40, wherein the shoulder bolt 36 is disposed within the mandrel 30 to pivotally mount the brake shoe 32 into position above the cart wheel 38. A torsion spring 28, as shown in FIG. 5, having a top member 27 and bottom member 29 is held in position by the mandrel 30 which extends through the center looped portion 23 of the torsion spring body 28. The top member 27 of the torsion spring 28 bears against the inside top surface 41 of the housing 40 and the bottom torsion spring member 29 bears against the top brake shoe surface 31 to exert continuous pressure on the brake shoe 32, biasing the brake shoe 32 against the wheel 38. The bottom torsion spring member 29 includes a vertical leg member 25 extending perpendicular therefrom, disposed between the inside top surface 41 of the housing 40 and the first brake shoe cable tab eyelet 24 or disposed within a second brake shoe spring tab eyelet 26 to maintain alignment of the torsion spring with the brake shoe 32. As shown in FIGS. 6 and 7, the brake assembly 10 is mounted within the wheel housing 40 attached to the frame 56 of a typical shopping cart 50.

Figure 8:
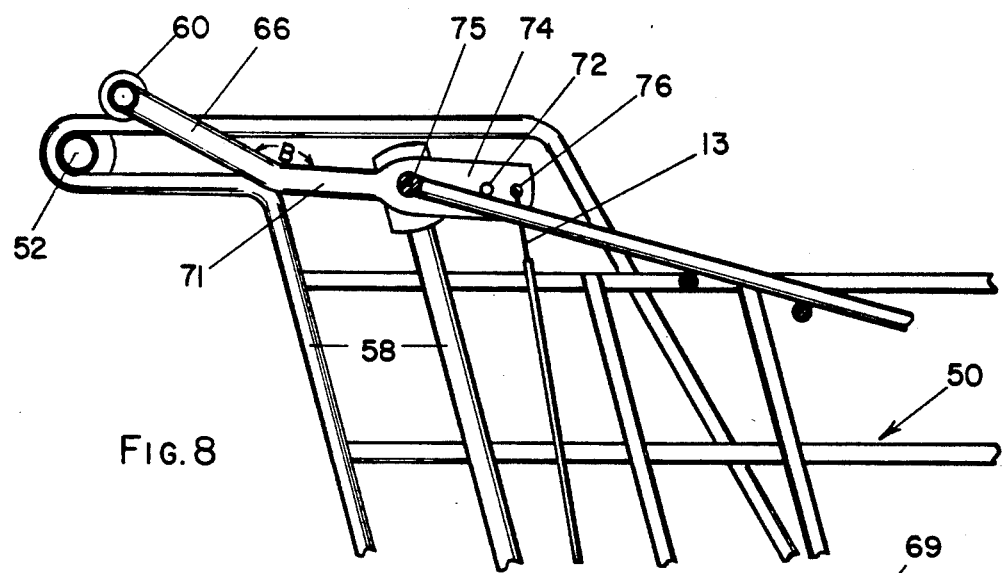
FIG. 8 is a plane side view of the present invention showing the handle assembly mounted to the shopping cart frame.

FIG. 1, shows the handle assembly 14 of the present invention, having a substantially horizontal central tubular handle member 60 having a plurality of holes 62 therein located near the outer ends thereof, whereby the holes 62 are adapted to threadably engage one of more set screws 64. A pair of "L" shaped handle rods 66 having medial arms 68 oriented in the horizontal plane have the proximate ends 69 of the medial arms 68 rotatably and slidably disposed within the central tubular member 60, for connecting the central tubular member 60 to the cart frame 56. The proximate ends 68 of the handle rods 66 are inserted into the central tubular handle 60 and slidably adjusted therein to obtain the proper handle width for a particular cart 50, after which the set screws 64 are tightened against the portion of the handle rods 66 retained therein to secure the handle rods 66 immovably within the central tubular member 60. The distal ends 70 of the "L" shaped handle rods 66 are bent at an angle of approximately 90 degrees, to form Angle "A" to define lateral arms 71 as best shown in FIG. 1, being bent from the vertical to the horizontal axis in alignment with one another to facilitate attachment of the brake handle 14 to the sides of the cart frame 56. The lateral arms 71 of the handle rods 66 are bent slightly at an obtuse angle, Angle "B" with respect to the horizontal plane, as shown best in FIG. 8, in order to provide the necessary travel required to disengage the brake when the brake handle 14 is squeezed together with the cart handle 52.

The distal ends 70 of each of the handle rods 66 include a flattened end portion 74 provided with a frame attachment hole 75 for pivoting the handle 14, and at least one hole 76 therethrough to provide a connection means for a connecting cable 13 as best shown in FIGS. 1, and 7-13. Near the distal ends 70 of each one of the lateral arms 71 of the handle rods 66, a stud 72 is mounted extending perpendicular inwardly and/or outwardly therefrom, in alignment with, and facing one another. The stud 72 may be positioned directly in front of or behind the frame attachment hole 75, depending upon the structural design of the cart frame 56.

As shown in FIGS. 6–10, the typical commercially available shopping cart 50 is comprised of a generally rectangularly shaped wire basket 51 having a pair of opposing side panels 54, connected to a front end panel 55, whereby the side panels 54 and front end panel 55 are connected to a floor panel 59. A hinged rear panel 53 is pivotally connected between the top, rear corner of the side panels 54. The wire basket 51 is usually mounted onto a cart frame 56. The cart 50 shown in FIG. 10, also incorporates horizontal reinforcement rods, vertical reinforcement rods 58, and a pair of diagonal reinforcement rods 59 to support the shopping cart handle 52.

FIGS. 1, 4, 6, and 7 show that a cable 13 is attached to the brake shoe cable tab eyelet 24 and extends through a cable conduit 16 from the handle assembly 14 to the top of the wheel housing 40. A retainer eyelet 17 is attached to the end of the conduit 16 and extends through a ¼ inch hole 18 in the top of the wheel housing 40. A cable retaining clip 19 is affixed to the top of the wheel housing 40 with a screw 20 to hold the retainer eyelet 17 in position against the housing 40 when the cable 13 is pulled to disengage the brake 32.

Figure 9:
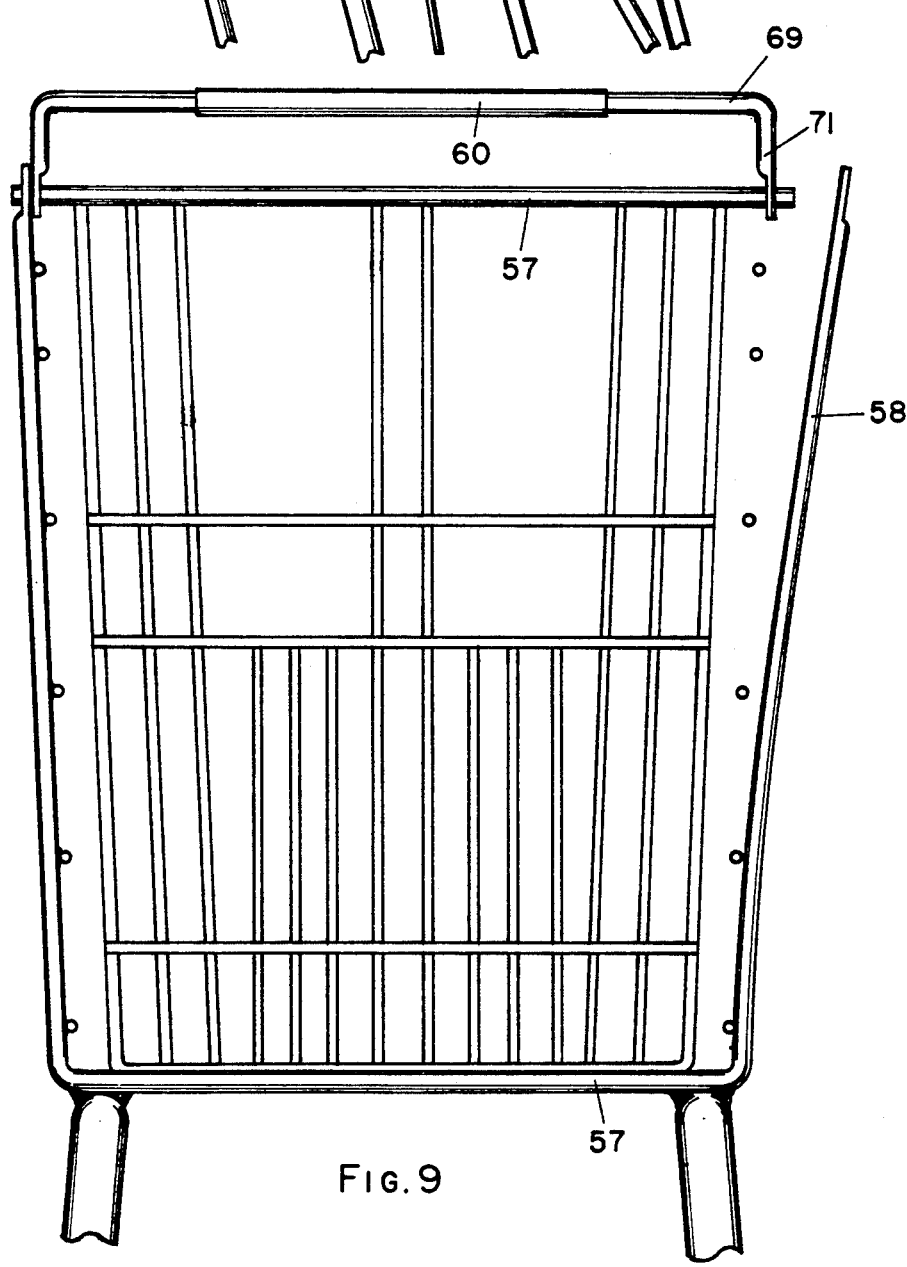
FIG. 9 is a rear view of the shopping cart showing the temporary detachment of a vertical reinforcement basket rod for pivotally mounting the lateral arms of the handle assembly to the shopping cart frame.
Figure 10:
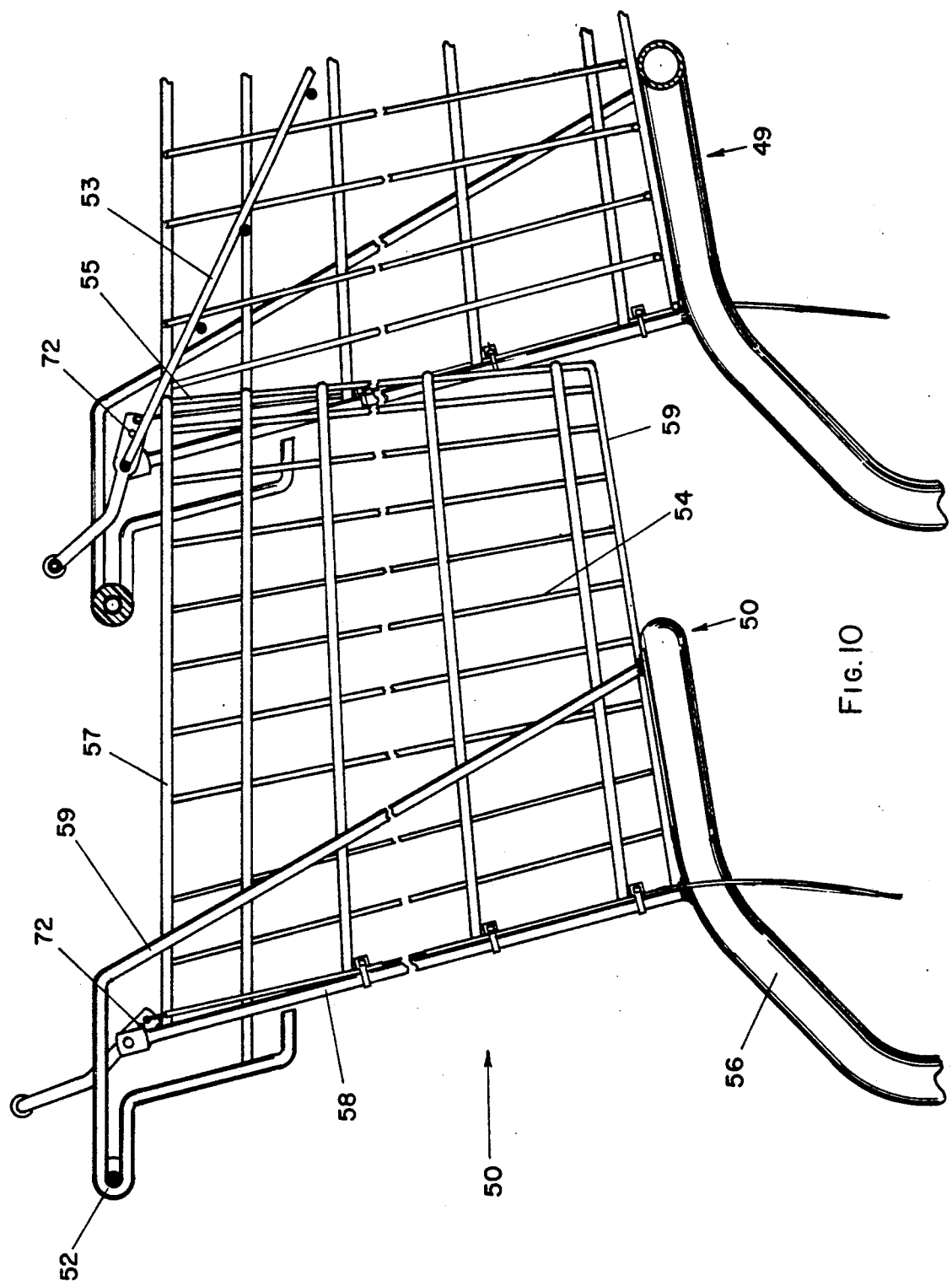
FIG. 10 shows the position of the brake handles with respect to the movement of the rear hinged panel of a parked shopping cart during the stacking procedure.

FIGS. 6, 7, and 10 show the handle assembly of the present invention. The handle assembly 14 is attached to the frame 56 of the shopping cart 50 by detaching the rear vertical basket reinforcement rod 58, as shown in FIG. 9, and inserting the distal end of the upper rear horizontal reinforcement rod 57 through the frame attachment hole 75 of the lateral arm 71. The reattachment of the rear vertical basket reinforcement rod 58 over the flattened handle rod end 76 provides for the handle assembly 14 to be pivotally mounted onto the cart frame 56. The distal end of the connecting cable 13 is inserted into the cable attachment hole 76 and fastened thereto. The central tubular handle member 11 may be slidably adjusted to position the lateral arms 71 of the handle rods 66 to provide a tight fit.

When the cart 50 is in the parked position, the torsion spring 28 exerts sufficient tension on the brake shoe 32 to hole the brake shoe 32 against the surface of the wheel 38 pulling the connecting cable 13 downward, thereby pulling the flattened handle rod 74 downward, to pivot the handle 14 upward and forward at the attachment point 75 as shown in FIG. 7.

When a user pulls the handle 14 backward and downward squeezing the handle 14 together against the cart handle 52, the handle 14 pivots at handle attachment point 75, lifting the flattened rod end 74 upward and pulling the connecting cable 13 to compress the torsion spring 28 and disengage the brake shoe 32 from the wheel 38 as shown in FIG. 6.

As shown in FIG. 10, when a plurality of carts 50 are stacked one behind the other, the front, upper portion of the front end panel 55 of the cart being parked 50 will contact the hinged rear panel 53 of the preceding parked cart 49 pivoting the hinged rear panel 53 of the parked cart 49 upward, whereby the vertical reinforcement rod 58 of the hinged rear panel 53 slidably engages the studs 72 extending from the lateral arms 71 of the parked cart 149 to pivot the handle 14 backward disengaging the brake 32 of the preceding cart 50. Thus, several carts can be stacked together and controlled with the engaged brakes 32 of the last cart 50 of the stack.

The foregoing detailed description is given primarily for clearness of understanding and no unnecessary limitations are to be understood therefrom for modification will become obvious to those skilled in the art based upon more recent disclosures and may be made without departing from the spirit of the invention and scope of the appended claims.

I claim:

1. A shopping cart brake system, comprising:
   1) a first shopping cart having a front end panel and an upwardly pivotal hinged rear panel, said upwardly pivotal hinged rear panel having at least one reinforcement rod extending along the side thereof;
   2) a universal wheel brake assembly comprising:
      a wheel housing mounted to the frame of a shopping cart;
      a wheel rotatably mounted onto an axle within said wheel housing;
      a curved brake shoe substantially enclosed within said wheel housing having an outer exterior surface and an interior high surface area contact surface, said brake shoe having a mandrel attached at one end of said exterior surface and a tab extending from said exterior brake shoe surface having at least one hole therein;
      means for pivotally attaching said brake mandrel within said wheel housing providing for engageable contact of said interior contact surface of said brake shoe with said wheel;
      spring means within said housing for biasing said brake shoe against said wheel for locking said wheel; and
      means for retracting said brake shoe permitting rotation of said wheel, said means comprising a cable connection within said wheel housing; and
   3) a handle assembly, comprising:
      a stationary handle;
      a pivoting handle having a central member with a pair of lateral arms extending therefrom in cooperative communication with said cable connection means;
      means for pivotally attaching said lateral arms to the frame of said shopping cart, whereby said lateral arms extend past said pivot point;

stop means for limiting pivotal movement of said pivoting handle;

means for connecting said pivoting handle with said brake assembly whereby manual pivotal movement of said pivoting handle in a backward and downward direction compresses said spring means to unbias and disengage said brake shoe against said shopping cart wheel permitting rotation of said wheel, and releasing said pivoting handle allows pivotal movement of said handle in the opposite direction allowing said spring means to automatically bias said brake shoe against said wheel preventing rotation of said wheel; and said stop means being in cooperative engagement with said pivoting handle for limiting pivotal movement of said pivoting handle and actuating the brake, said stop means being cooperably engageable with said reinforcement rod extending along the side of said upwardly pivotal hinged rear panel of said cart whereby engagement of a front end panel of a second cart being stacked within said first parked cart engages said upwardly pivotal hinged rear panel of said first cart pivoting said hinged rear panel upward moving said reinforcement rod and slidably engaging said stop means of said first cart extending from one or both of said lateral arms of the parked first cart to pivoting said pivoting handle disengaging said brake of said front parked first cart.

2. The shopping cart brake system of claim 1, wherein said means for pivotally attaching said brake mandrel within said wheel housing is a bolt.

3. The shopping cart brake system of claim 1, wherein said spring means is a torsion spring.

4. The shopping cart brake system of claim 1, including a cable conduit surrounding said cable and a retainer eyelet to limit movement of said cable conduit during movement of said cable.

5. The shopping cart brake system of claim 1, wherein said interior contact surface of said brake shoe is gnarled.

6. The shopping cart brake system of claim 1, including frictional tape applied to the interior contact surface of said brake shoe.

7. The shopping cart brake system of claim 1, wherein said means for pivotally attaching said lateral arms to the frame of said shopping cart is one of the rods comprising said shopping cart wire basket frame.

8. The shopping cart brake system of claim 1, wherein said lateral arms extending pass said pivot point include at least one hole for attachment of a cable.

9. The shopping cart brake system of claim 1, wherein said stop means for limiting pivotal movement of said handle comprises at least one stud extending perpendicular inwardly or outwardly therefrom.

10. The shopping cart brake system of claim 9, wherein said stud is slidably engageable with said rod supporting said handle.

11. The shopping cart brake system of claim 1, wherein said pair of lateral arms are "L" shaped.

12. The shopping cart brake system of claim 11, wherein said lateral arms are adjustably retained within said central member, said pair of lateral arms being bent vertically at an obtuse angle to provide the necessary travel to disengage said brake shoe upon pivoting of said brake handle.

13. The shopping cart brake system of claim 12, wherein said pair of lateral have bent at an obtuse angle to provide the necessary travel to disengage said brake shoe upon pivoting of said brake handle.

14. The shopping cart brake system of claim 1, wherein said lateral arms have flattened distal ends extending pass said pivot point, said flattened distal ends having at least one hole therein for attachment of a cable.

15. A shopping cart brake system, comprising:
1) a shopping cart comprising:
   a frame having wheels;
   a generally rectangularly shaped wire basket having a pair of opposing side panels connected to a front end panel and a floor panel, and a hinged rear panel pivotally connected between the top, rear corner of said side panels; and
   said wire basket having at least one pair of vertical and diagonal reinforcement rods supporting said wire basket;
2) a universal wheel brake assembly comprising:
   a wheel housing mounted to the frame of a shopping cart;
   a wheel rotatably mounted onto an axle within said wheel housing;
   a curved brake shoe substantially enclosed within said wheel housing having an outer exterior surface and an interior high surface area contact surface, said brake shoe having a mandrel attached at one end of said exterior surface and a tab extending from said exterior brake shoe surface having at least one hole therein;
   means for pivotally attaching said brake mandrel within said wheel housing providing for engageable contact of said interior contact surface of said brake shoe with said wheel;
   spring means within said housing for biasing said brake shoe against said wheel for locking said wheel; and
   means for retracting said brake shoe permitting rotation of said wheel comprising a cable connection within said wheel housing; and
3) a handle assembly, comprising:
   a stationary handle;
   a pivoting handle having a central member with a pair of lateral arms extending therefrom in cooperative communication with said cable connection means, said lateral arms being adjustably retained within said central member, said pair of lateral arms being bent vertically at an obtuse angle to provide the necessary travel to disengage said brake shoe upon pivoting of said brake handle;
   means for pivotally attaching said lateral arms to the frame of said shopping cart, whereby said lateral arms extend past said pivot point;
   stop means attached to said lateral arms for limiting pivotal movement of said pivoting handle; and
   means for connecting said handle with said brake assembly whereby manual pivotal movement of said pivoting handle in a backward and downward direction compresses said spring means to unbias and disengage said brake shoe from against said shopping cart wheel, and releasing said pivoting handle allows pivotal movement of said handle in the opposite direction allowing said spring means to automatically bias said brake shoe against said wheel preventing rotation of said wheel; and stacking of a plurality of said shopping carts one behind the other, projects said front end panel of a cart being inserted within said parked cart, pivoting said hinged rear panel of said parked cart upward, whereby said vertical reinforcement rod of said hinged rear panel slidably engages said stop means extending from said lateral arms of said parked cart pivoting said handle disengaging said brake of said preceding cart, so that several carts can be stacked together and controlled with the engaged brakes of the last shopping cart in the stack.

* * * * *